United States Patent
Liem et al.

(10) Patent No.: US 11,637,835 B2
(45) Date of Patent: Apr. 25, 2023

(54) SYSTEM AND METHOD FOR CONTEXT-SENSITIVE ACCESS CONTROL

(71) Applicant: Irdeto Canada Corporation, Ottawa (CA)

(72) Inventors: Clifford Liem, Ottawa (CA); Martin Soukup, Ottawa (CA); Daniel Murdock, Ottawa (CA)

(73) Assignee: Irdeto B.V., Hoofddorp (NL)

( * ) Notice: Subject to any disclaimer, the term of this patent is extended or adjusted under 35 U.S.C. 154(b) by 203 days.

(21) Appl. No.: 16/904,009

(22) Filed: Jun. 17, 2020

(65) Prior Publication Data

US 2021/0400048 A1 Dec. 23, 2021

(51) Int. Cl.
*H04L 29/06* (2006.01)
*G06N 5/04* (2006.01)
(Continued)

(52) U.S. Cl.
CPC ............. *H04L 63/102* (2013.01); *G06N 5/04* (2013.01); *G06N 20/00* (2019.01); *G07C 9/29* (2020.01);
(Continued)

(58) Field of Classification Search
CPC . H04L 63/102; H04L 63/08; H04L 2463/082; G06N 20/00; G06N 5/04; G07C 9/29
See application file for complete search history.

(56) References Cited

U.S. PATENT DOCUMENTS 6,321,339 B1 * 11/2001 French .................... G06F 21/33
  726/2
10,369,966 B1 * 8/2019 Higgins ............. G07C 9/00571
(Continued)

FOREIGN PATENT DOCUMENTS

WO 2015/127256 A1 8/2015
WO 2019/190619 A1 10/2019

OTHER PUBLICATIONS

EP21180051.1, Extended European Search Report dated Oct. 29, 2021.
(Continued)

*Primary Examiner* — Kambiz Zand
*Assistant Examiner* — Afaq Ali
(74) *Attorney, Agent, or Firm* — Rimon PC (57) ABSTRACT

Methods and systems for providing secure digital access to services are described. Embodiments include user behavior tracking, learning, and updating one or more contextual access algorithms and thereafter can act as multi-factor authentications. The method may include receiving data for a group of users and initializing a machine learning algorithm with the group data. The method may also collect individual user data and context data periodically, including characteristic behavior data, and update the machine learning algorithm with the individual user data. The method may further calculate a threshold for tolerance based on the updated algorithm, and verify user requests for access to the service. A multi-factor authentication may be presented to the user when the verifications are not acceptable, such as by being below a threshold. A permissions data structure can be generated and used to control access to the service.

36 Claims, 7 Drawing Sheets

(51) Int. Cl.
*G06N 20/00* (2019.01)
*G07C 9/29* (2020.01)
*H04L 9/40* (2022.01)

(52) U.S. Cl.
CPC ........ *H04L 63/08* (2013.01); *H04L 2463/082* (2013.01)

(56) References Cited

U.S. PATENT DOCUMENTS

| | | |
|---|---|---|
| 2011/0016534 A1* | 1/2011 | Jakobsson ............. H04L 67/535 726/28 |
| 2013/0191908 A1 | 7/2013 | Klein |
| 2015/0096002 A1 | 4/2015 | Shuart et al. |
| 2016/0239649 A1 | 8/2016 | Zhao |
| 2017/0034152 A1* | 2/2017 | Subramanya ......... H04L 63/101 |
| 2017/0116804 A1* | 4/2017 | Bae .................... G07C 9/00571 |
| 2017/0227995 A1* | 8/2017 | Lee ........................ G06N 20/00 |
| 2017/0289168 A1* | 10/2017 | Bar ........................ G06F 21/316 |
| 2017/0317993 A1* | 11/2017 | Weber ..................... H04L 63/08 |
| 2018/0069867 A1 | 3/2018 | Grajek et al. |
| 2018/0247034 A1 | 8/2018 | Goldsmith et al. |
| 2018/0365388 A1* | 12/2018 | Lerner .................. H04W 12/08 |

OTHER PUBLICATIONS

International Preliminary Report on Patentability issued in related PCT Application No. PCT/IB2021/055365 dated Dec. 13, 2022, 7 pages.

* cited by examiner

SYSTEM AND METHOD FOR CONTEXT-SENSITIVE ACCESS CONTROL

FIELD OF THE INVENTION

The present disclosure generally relates to access security, and in particular, to applying contextual algorithms to enhance security for access to services.

BACKGROUND

There are many known applications of controlling access to various services. For example, it is well known to control access to physical spaces, use of vehicles and other machinery, and digital services such as content distribution or information services. The term "services", as used herein, is understood to encompass access to physical spaces, use of physical machines/devices or features thereof, and use of digital services. Further "access control" may include controlling any level of service or physical space, in addition to securely opening doors and starting vehicles. Some examples include access to streaming audio or video services, parking services, restaurants, and highway tolls. Any service that makes use of a digital connection may now require a user authentication in order to provide access.

The "Internet of Things" (IOT), "connected transport" (CT) and other connected technologies have created increased expectations of the availability of services such as car sharing, vacation rentals, equipment, and services. The ability to scale and adapt to shifting customer demands quickly and to offer services tailored to customers' specific needs have shifted the landscape of many industries. Mobile, affordable connectivity, the existence of ubiquitous app ecosystems, and the "-as-a-service" economy have created expectations that services should be readily available.

Many of the companies driving these changes in consumer behavior and expectations are in turn demanding those same capabilities themselves, reducing capital costs, demanding improved operational efficiency, and striving to buy just what they need, just when they need it. Equipment leasing and rental is just one example. Additionally, in the increasingly global economy, assets like forklifts, excavators, or access platforms are deployed further and further from the control of the equipment's owner with increasing risk to the value of both the capital asset itself as well as the corresponding service value over the useful lifetime of the equipment.

Telematics, maintenance checklists, and ID systems have been deployed to equipment with limited inter-connectivity and equally limited success, but much of the business value of these systems remains locked in vendor-specific systems, clumsy and unfocused user interfaces, and stale, unleveraged data.

One common application of control to services is to control access to a vehicle, machine, or physical area using a "key fob". Key fob systems allow great convenience for accessing vehicles and other areas. For example, gaining access to vehicles, is now as simple as carrying a dedicated mobile user device, sometimes referred to as a "key fob" in a pocket or purse. With various digital systems now becoming more connected to other devices, users demand increasing convenience from their smart devices. As a result, it has become possible to use general purpose mobile user devices, such as smartphones and smartwatches as "key fobs" for controlling access to everyday connected items like computers, homes, and vehicles.

Current implementations of mobile user devices for security access are susceptible to security problems such as "relay attacks." Relay attacks are various mechanism by which attackers have found ways to amplify and relay signals between a target service, for example a vehicle, and the authorized user device used to control access to thereby simulate proximity of the user device to gain access. In a unidirectional relay attack, the low frequency (LF) signal from the vehicle is relayed through relay devices to the authorized user device which then sends a high frequency (HF) signal back to the vehicle. This is a simple set-up provided the authorized user device is close enough to the vehicle to unlock it. In another example of a relay attack, the LF signal from the vehicle is sent through relay devices to the authorized user device, and the HF signal is then returned from the authorized user device through the relay devices back to the vehicle. In both cases, the natural range of the system is augmented for the purposes of making it appear to the vehicle that device of the authorized user is in the proximity of the vehicle. Of course, relay attacks are not limited to vehicle access and can be used to attack many types of access control systems that utilize proximity of a user device for access control. Further other attacks such as cloning, cryptographic key theft, mobile phone cloning, digital key cloning/copying, hacking on the mobile device, ransomware & targeted malware, replay attacks, and social engineering attacks (e.g. where the driver is distracted as they are entering a vehicle and an attacker jumps in the passenger side, starts vehicle and drives off) are also known for attacking access control systems.

Further, in many applications, access is not binary as there can be many levels of access. For example, machinery, such as an automobile, has many systems and capabilities that can be accessed to various degrees. For example, a user may be permitted to drive an automobile, but the use may be limited in speed or distance. As another example, the user may be able to drive the automobile but not permitted to access the navigation system or other auxiliary equipment. Similarly, a user may be permitted to operate a piece of construction machinery only on a specific worksite and only during the operator's shift hours and or when a supervisor is on duty. In summary, the connected world has raised the possibilities of many new business models, safety features, and information sharing mechanisms.

SUMMARY

In order to realize much of the promise of IOT and connected transportation technologies, controlling access to services requires a convenient, seamless, and secure solution which combats would-be theft and/or other misuse of any service without compromising the user experience. There is a need therefore for a more robust and flexible solution for securing and enforcing digital user access to services such as the use of machinery. The disclosed implementations include multi-factor considerations across users, equipment, and external context, for accomplishing flexible, convenient, and secure access control to services.

A brief summary of various embodiments is presented below. Some simplifications and omissions may be made in the following summary, which is intended to highlight and introduce some aspects of the invention. Detailed descriptions of embodiments adequate to allow those of ordinary skill in the art to make and use the inventive concepts will follow in later sections.

Various implementations are described herein. A first implementation includes a method for authorizing a user for controlling access permissions to a service, the method comprising: receiving at least one of behavioral data for a group of users and/or contextual data relating to the service; receiving, from a user device, a first digital key access request; receiving at least one of current user behavioral characteristic data from the user device and current contextual data at a time corresponding to the first digital key access request; generating a likelihood value, indicating the likelihood the first digital key access request is a valid request based on at least one of current user behavioral characteristic data and current contextual data; authenticating the user for access when the current user likelihood value is determined to be acceptable; and generating a permissions data structure, wherein the permissions data structure can be used to control access to the service.

A second implementation includes a computer system for authorizing a user for controlling access permissions to a service, the method comprising at least one computer processor and at least one memory operatively coupled to the at least one computer processor and storing computer readable instructions, which, when executed by the at least one processor, cause the at least one processor to; receive at least one of behavioral data for a group of users and/or contextual data relating to the service; receive, from a user device, a first digital key access request; receive at least one of current user behavioral characteristic data from the user device and current contextual data at a time corresponding to the first digital key access request; generate a likelihood value, indicating the likelihood the first digital key access request is a valid request based on at least one of current user behavioral characteristic data and current contextual data; authenticate the user for access when the current user likelihood value is determined to be acceptable; and generate a permissions data structure, wherein the permissions data structure can be used to control access to the service.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Disclosed implementations can leverage user behavior-based analytics and/or contextual analytics to determine regular usage patterns of users and use the determination as an authorization condition. Information on regular behavior and patterns of the user or similar users may be used to distinguish from irregular behavior and patterns as it relates to use of services. Algorithms for computing the analytics are referred to as "contextual access algorithms" herein. Once an irregular behavior has been detected, the system may use additional methods to ensure access request is from an authorized user. Sensors of a user device, such as user's smartphone, can be used to gather user and contextual data. For example, an accelerometer, gyroscope, proximity detector, camera, barometer, magnetometer, microphone, and location system can be used as sensors. Other sensors or systems may be used to gather contextual data related to the requested service, as described in more detail below. For example, in the case of the service being use of a vehicle, On Board Diagnostics-II (OBDII) dongles, on-dash units, and vehicle's In-Vehicle Infotainment unit (IVI) may be used as sources of contextual data. In the case of the service being use of a machine, Electronic Logging Device (ELD) data can be used as contextual data. Other examples of systems having sensors that can be used to gather contextual data related to the service can include Telematics Control Unit (TCU), Telematics Box (T-box), CAN Gateway Module (CGM), Gateway Module (GM), Head-Unit (HU), Dash Display ECU and other ECUs and corresponding sensors.

Behavior modeling may be performed on a user smartphone with a computational assist from resources in a cloud-based server. Behavior modeling can also be done on equipment associated with the service, such as an on-board computer of a vehicle. Behavior modeling may be accomplished on a periodic basis at a default interval, such as 10 minutes, or upon occurrence of specified events or triggers. The modeling process can be accomplished less often, (for example at longer intervals) to conserve power and/or computing resources or more often (for example at shorter intervals) for finer granularity on sensor data captured. At each point that data is captured, such as a sensor event, various data may be captured, such as: time and date, location data (e.g. GPS data or a list of nearby Wi-Fi Access points), a range of accelerometer readings at a predefined sub-interval (for example, ten seconds), barometer readings, and environmental sound data. Of course, data may be omitted when not available. Again, the data may be sent directly to a cloud-based server for processing. Optionally, the processing of the data may be split between the user device, any on-board device, and the cloud. For example, intermediate sets of data can cut down on the data that needs to be sent to the cloud. Alternatively, the user device or the on-board device may perform all of the behavioral model processing. The resulting behavioral model is used to determine whether an access request is likely to be generated by an authorized user.

Figure 1:
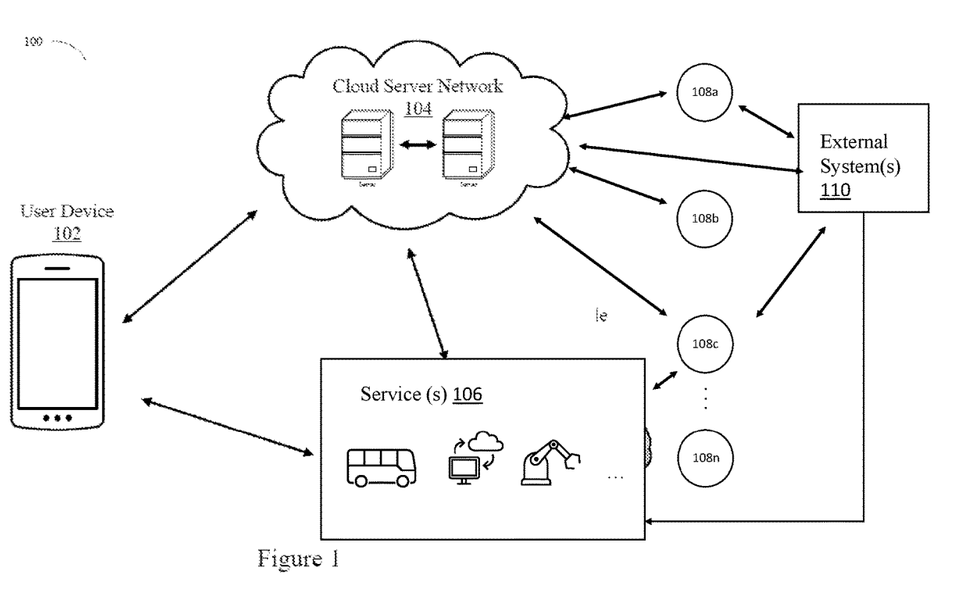
FIG. 1 is a block diagram of a system for context-sensitive access control, in accordance with some implementations.

FIG. 1 is a block diagram of a system 100 for contextual access control of a service, use of a machine for example, in accordance with some implementations. Of course, the elements of system 100 can be applied to access to any service. System 100 may include user device 102, cloud server network 104 and service 106. Service 106 can be controlled by associated computing devices and can include use of a vehicle, use of a computer/online service, use of a machine tool, and the like, as indicated by the icons. User device 102 may be a smartphone, a smartwatch, a tablet, a computer, or any other electronic device that can be reliably associated with a user.

Sensors 108a, 108b, 108c . . . 108n can be configured to sense and collect contextual data. The sensors (individually and collectively referred to as "sensors 108" below) can collect "external" contextual data, i.e. data that is external to the service and/or the user. Sensor 108a is an example of a sensor that collects external contextual data by being operatively coupled to external system 110. Sensor 108c is an example of a sensor that collects "internal" contextual data (or "state data") that relates directly to the service. In the example of the service being use of a vehicle, state data can include mileage data, location data (such as GPS data), current speed of vehicle and other data that originates from and/or describes and attribute or state of the service 106. Other examples of state data of the service can include usage history of a machine, work schedule of the machine, damage to the machine, safe operations rules for the machine, maintenance schedule of the machine, odometer data of the machine and/or current or recent location of the machine. In the case of the service being a computing service, available bandwidth of a computing device, and the like may be state data. Further, as shown in FIG. 1, external system(s) 110 can communicate directly with service(s) 106 and/or cloud Server network 104 through any type of communication connection, such as the internet, NFC, Wi-Fi, Bluetooth of the like. Alternatively, external system 110 can communicate with services 106 through a sensor, such as sensor 108c, without the need for cloud server network 104 for such communications.

External system 110 can be any system capable of storing and/or producing contextual data (which can include service state data recorded and/or stored externally). Examples of contextual data that can be provided by external system 110 include data relating to at least one of, a Single-Sign-On (SSO) history for the machine or user, user license/permits/registration (such as the Ontario Ministry of Labour online license tracking system "Skills-Pass" or The International Powered Access Federation "IPAF" database), ELD data relating to use history of the machine, user work schedule data, user login history data, other use history of the machine, data indicating a relationship of the user to other users, operator checklist data, work order data, vacation schedule data, sick leave data, holiday schedule data, and/or data indicating legal limits on usage of the machine. External system 110 can provide external data that is not necessarily unique to the service and/or does not necessarily originate from the service, such as weather data, network bandwidth data, personnel data, and the like. The contextual data can be selected based on at least one of site policy, system configuration and/or operator preference.

For example, service 106 could be a piece of mobile construction machinery and may have associated sensors 108 such as an accelerometer, a GPS location device, a barometer, a camera, and/or one or more microphones. Service 106 and user device 102 may be able to communicate through various protocols/connections. For example, user device 102 may send data to service 106 through a Bluetooth connection or through TCP/IP, i.e. the internet.

One or more servers in cloud server network 104 may track and receive data from service 106, external systems 110, and/or user device 102. For example, as noted above, user device 102 may track and receive sensor data and input it into one or more contextual access algorithms, such as a machine learning model. Other examples of contextual access control algorithms can include imperative, heuristic, statistical, functional modeling, simulated annealing, nearest neighbor search, and time series matching in addition to the broad class of machine learning algorithms. User device 102 may transmit all or part of the sensor data to cloud server network 104 where further computation may occur. For example, user device 102 may transmit microphone, GPS and accelerometer data to a server in the cloud server network 104. One or more machine learning algorithms may be applied to the transmitted data, as described in greater detail below. For example, cloud server network 104 may maintain a recurrent neural network (RNN) and input the received data every time a specified event, such as a user attempt to access the service, occurs or at fixed or variable time intervals. Similarly, service 106 may transmit all or part of its sensor data to cloud server network 104 for applying/updating the algorithm.

Service 106 may track and maintain its own data and contextual access control algorithm locally, on an onboard computer for example. User device 102 may transmit updates to service 106 either directly or through cloud server network 104 where the data may be stored and used to update the algorithm. Cloud server network 104 may store and aggregate data from many users. The cloud server network 104 may create an initialization basis for profiles based on the user data. For example, when a user device 102 is first initialized to learn from individual user profile data, the user device 102 may use the group data to initiate the machine learning algorithm.

Figure 2:
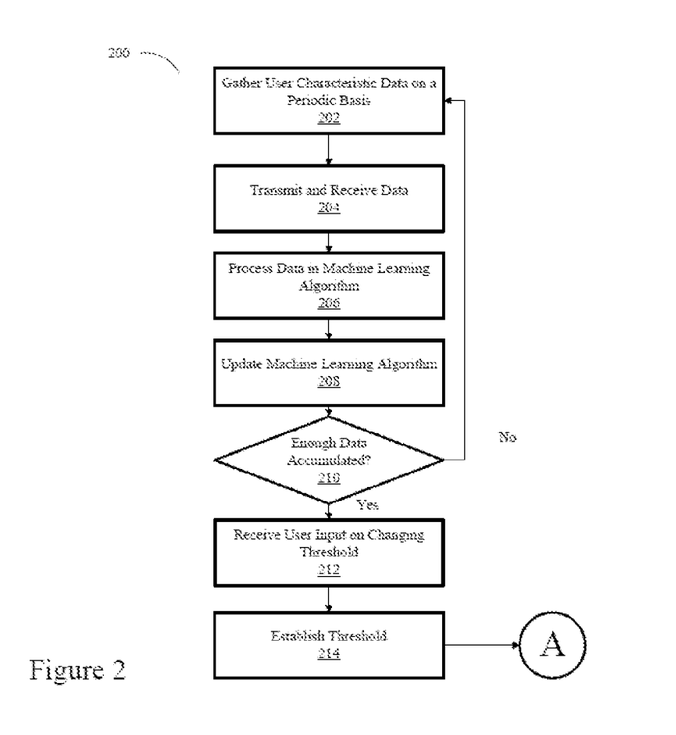
FIG. 2 is a flowchart representation of a method of learning user behavior for vehicle access control in accordance with some implementations.

FIG. 2 is a flowchart representation of a method 200 of learning user behavior for vehicle access control in accordance with some implementations that utilize a machine learning model as the contextual access control algorithm. Method 200 may begin in step 202 where the user device 102, cloud server network 104, and/or service 106 may each individually or all collectively collect user behavioral characteristic data. The devices from system 100 may collect data on a periodic basis such as each 10 minutes or every hour. Similarly, they may collect data in response to various events such as a user attempting to access a service, a user or service reaching a specific location, a user interacting with a web site, a user making a telephone call.

Data may be gathered to be applied to authorization through a prediction of when and/or under what circumstances an authorized user is likely to access the service. Examples of data to be taken in this example may include:

Number of accesses to the service
Location data
Time of day
Day of week
Month of year
Speed and angle of approach to vehicle or other service location Barometer data
Accelerometer data
Ambient noise level data
Demographic data
Weather data for a destination location
Maintenance history of a vehicle or other machine
User history safety data Periodic and/or event-based readings of the sensors 108 and sensors of user device 102 as appropriate to the above factors may provide the data for a learning phase of the machine learning algorithm. The first set of data can be used to determine general behavior over demographics (gender, age, geographic region, experience, etc.) to draw conclusions on normal behavior for those demographics. A subsequent sets of data can provide a tailored set of data to draw conclusions on behavior for the specific individual. This can determine a custom model for the individual at hand.

The loop in method 200 may be used during an initialization phase for building a decision model. The initialization phase may include use and collection of data for groups of users, including categorization by demographic and/or user type. In another embodiment, the loop in method 200 may be used during an individual user learning method.

When an unregistered user first uses system 100, there might not be personal data available for the user. Therefore, the only data that can be used is population or group data. Population data may allow the system to be initialized for a likely profile and be fine-tuned to the individual through further use. For example, geographic region-based data may allow the system to reflect most users in the geographic region. When available, demographic information, such as, gender, age, geographic region, and experience may allow the system to be tuned to the individual demographic. Of course, in some cases, user data can be obtained from external system(s) 110.

As the machine learning algorithm is used, dynamic learning of the system will provide more personalized data. An individual who has particular service access patterns may result in individualized data populating the system. The prediction model will therefore be tuned to the individual as more and more user-specific data is gathered. The dynamic user-specific data may also add to the group data, so that the group model may also be improved over time.

User device 102, cloud server network 104, or service 106 may proceed to step 204. In step 204 the devices may transmit and receive information from each other. For example, user device 102 may transmit individual user data collected locally to cloud server network 104. In another embodiment, service 106 may transmit and/or receive information for a group or an individual to and from cloud server network 104 or user device 102.

User device 102, cloud server network 104, or service 106 may then proceed to step 206. In step 206 one or more of the devices may process all or part of the data using a machine learning algorithm. Exemplary machine learning algorithms include algorithms such as decision tree, regression, neural network, time series, clustering, outlier detection, ensemble model, factor analysis, naïve Bayes formulation, support vector machine, linear regression, logistic regression, kNN, k-Means, random forest, dimensionality reduction, gradient boosting, apriori, nearest neighbor, attention layers, generative adversarial networks, and teacher-student curriculum learning.

The machine learning algorithm could be processed entirely on user device 102. For example, all of the data be collected on user device 102, as well as received from the other devices, can be processed locally on user device 102. Cloud server network 104 may perform or assist in the processing of the machine learning algorithm for user device 102 and/or service 106. For example, the machine learning system storing the machine learning algorithm(s) may be stored on cloud server network 104 and accessed over the internet by user device 102. The machine learning algorithm may be processed partially or completely on user device 102 or service 106 as well.

User device 102, cloud server network 104, or service 106 may then proceed to step 208. In step 208, the machine learning model, or other contextual access control algorithm, may be updated. Updating the machine learning model may include adding to a neural network and updating the hidden layers. Updating may also include adding data from step 202 to a support vector machine to distinguish user data from attacker data. Similarly, a naïve Bayes classifier may be updated so that the probabilistic model includes new individual or group data. Updating the machine learning model may include applying the machine learning algorithm to one or more sets of behavioral or context data. Other types of contextual access control algorithms can be updated through known mechanisms, such as adjusting parameters, modifying code, and the like.

The behavioral tracking performed using the algorithm, may identify the most frequented places for the user. For example, the locations may include home, work, church, and specific restaurants. Along with the locations, the time, day, and season in which the user accesses the service are recorded. Exceptions to the regular pattern may also be recorded.

The behavioral tracking feature of the algorithm may use accelerometer data to determine the most likely times that the user device is stationary or on a user. The device location data may also include the time of day, day of the week, and season, for example. The data may be categorized based on geographical location in the world as well as demographically.

Data on the logs of accessible WiFi access points or cellular radio stations may be tracked and correlated to locations. This may provide information on the set of most likely access points visible given a specific location. In some embodiments, barometer readings may be taken and correlated to locations. Barometer readings may provide information, for example, on the likelihood of a user being indoors or outdoors. The barometer readings can also be compared to external barometer readings proximate the service access point during a time of an access request.

Microphone readings may be taken to capture ambient noise levels or other audio information such as spoken words through speech recognition, identification of the user or other parties through voice recognition and the like. This may also provide information on the likelihood that the user is indoors or outdoors, at a specific location and/or with specific people. Actual accesses to services may be captured and correlated with the above data. The actual access data can be captured in a separate learning mode, but also in a continuous learning mode, such that the contextual access algorithm can improve over time. All of the data may be used to create, update, and/or apply one or more appropriate algorithms, such as a machine learning model or other predictive models, on the most likely times that the user accesses the service. Of course, the algorithm can be configured and used to evaluate factors other than use authentication, such as user safety, user capabilities, and condition of the equipment, all of which can be used to evaluate the scope of permissions that should be granted to the user for the service.

User device 102, cloud server network 104, or service 106 may then proceed to step 210. In step 210, user device 102 may determine whether the accuracy of the contextual access control algorithm is high enough that no further data needs to be retrieved. In step 210, cloud server network 104 may also determine whether enough group data has been established to produce a high probabilistic result for each demographic. When user device 102, cloud server network 104, or service 106 determine that not enough data has been accumulated then the respective device may return to step 202 to gather more data.

Figure 6:
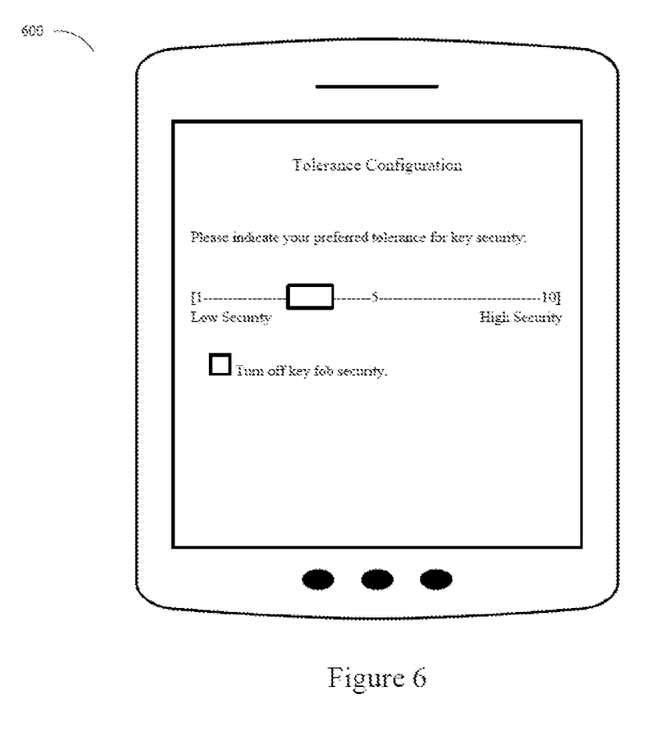
FIG. 6 illustrates an exemplary graphical user interface (GUI) in accordance with some implementations.

When an adequate amount of data is determined to be accumulated, user device 102, cloud server network 104, or service 106 may then proceed to step 212. In step 212 a graphical user interface may be presented to the user to select whether to change the threshold, possibly after further authentication. FIG. 6 illustrates an exemplary graphical user interface where the user may adjust or reset the threshold. User device 102, cloud server network 104, or service 106 may then proceed to step 214 where the threshold for comparison is finalized. Of course, a threshold is not required for all algorithms as some algorithms may yield a binary or quantitative decision without using a threshold.

In the case of a machine learning model, the contextual access control algorithm may determine an appropriate tolerance level by fusing the sensor data, such as location data, accelerometer data, barometer data, Wi-Fi access point data, microphone data, etc. Furthermore, the machine learning model or other algorithm may be extended to any number of sensor data to improve accuracy. The weighting of a particular data type compared to another data type can be tuned according to the intensive learning phase in steps 202-210. The building and maintenance of various algorithms generally is well known and not covered in exhaustive detail herein, In some implementations the threshold level can be best determined after analyzing a large set of data. For example, location data of the user device 102, location data of the service 106, and access times are three elements that may be used to derive a probability access model based on location. Alternatively, the threshold can also be determined by an unsupervised learning algorithm on a relatively small amount of data. For all of the data sets, similar data should be gathered in a controlled learning phase. The true accesses to service 106 may need to be placed above a chosen tolerance level, as noted above. Each of the sensor-based models may be fused into a single model. A combined threshold level may be determined from the individual threshold levels from each of the sensor-based threshold levels. The algorithm may also be flexible enough to ignore any missing information from an attempted access, should data for a particular source not be available for a specific attempted access.

Figure 3:
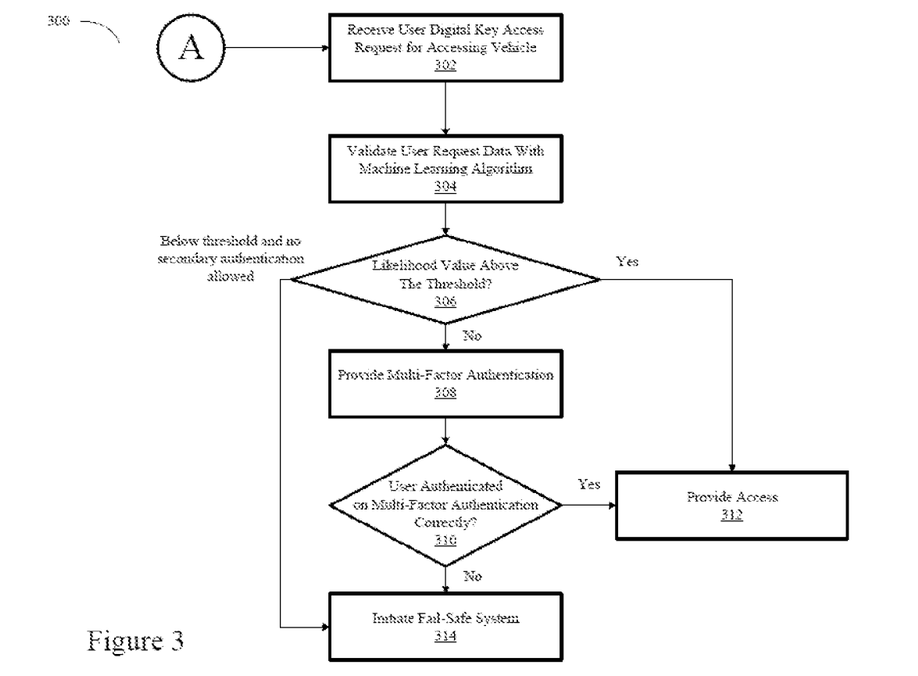
FIG. 3 is a flowchart representation of a method of user access request verification, in accordance with some implementations.

FIG. 3 is a flowchart representation of a method 300 of user access request verification, in accordance with some implementations. Method 300 may begin in step 302 where the user device 102, cloud server network 104, and/or service 106 may receive a digital access request from the user to access the service. Step 302 may continue from step 214 from FIG. 2, in some implementations. A user may trigger user device 102 to request access to service 106, when wanting to enter or start a vehicle for example. In other implementations, user device 102 may automatically trigger an access request (via Bluetooth or NFC, for example) when the user is in close proximity to service 106, or a corresponding location, and/or mechanically tries to operate the service, such as activating a door handle or other control.

User device 102, cloud server network 104, or service 106 may then proceed to step 304. In step 304 the access attempt may be validated using the contextual access control algorithm. For example, user device 102 may sample the current behavioral characteristic data timestamped at the time of the request. The sampled data may be then input into the contextual access control algorithm, such as a behavioral model created by a machine learning algorithm, for the access request to be ranked, relative to the learned access requests, to indicate the likelihood the request is valid. Similarly, the algorithm may be applied to the sampled data. The sampled data may have a likelihood value calculated by the user device 102, cloud server network 104 or service 106.

User device 102, cloud server network 104, or service 106 may proceed to step 306. In step 306 the likelihood value may be compared to the threshold established in steps 212-214 of the method described in FIG. 2. The threshold represents a value during which controlled accesses and key requests for the service are recorded. Therefore, the likelihood value is a single recorded instance of a weighted value received by the contextual access control algorithm. The likelihood value indicates the likelihood that this digital service access request is from the expected/authorized user as opposed to an attacker. Therefore, when the likelihood value is above the threshold, method 300, may proceed to step 312 where the digital keys, and scope of permission data are transmitted to service 106 and/or access is provided. A permissions data structure specifying a scope of permissions for access, by the user, to the service based on the state data can be generated. When the likelihood value is below the threshold, indicating an attacker may be attempting to gain access to the service (digital key replication, relay attack, etc.) then method 300 may proceed to step 308 for further verification, such as biometric identification. When the likelihood value is below the threshold, a reduced/default scope of permissions can be granted, or permissions can be denied entirely. The default scope of permissions can be based on at least one of site policy, system configuration and/or operator preference. Of course, the reduced/default scope of permissions can be based on context and the default can specify which user behavior data and context data is used, the weightings applied to the data, and which additional authentication mechanisms should be applied when necessary.

User device 102, cloud server network 104, or service 106 may proceed to step 308 for a multi-factor or secondary authentication of the user. Multi-factor authentication may include one or more additional factors to be authenticated. These factors may include one or more of the following:

requesting a user fingerprint
    requesting a password or pin
    facial identification
    user speech identification
    requesting user location information
    requesting a hardware token
    requesting a response by SMS or NFC communication with a user device
    requesting badge information
    requesting SSO history information
    user retina identification
    requesting EKG information of the user
    secret knowledge challenge
    user weight and/or height
    other user distinguishing features One or more authentication factor types can be used as the secondary factor authentication. When two or more factor types are presented, then the second factor may be chosen randomly. The user may be permitted to try another challenge if they do not prefer, or forget the current challenge (for example, forgot PIN or password). Trying another challenge may be repeated. User device 102, cloud server network 104, or service 106 may proceed to step 310 where the user may be permitted to try again with another authentication factor if the second authentication fails. When, for example the user fails a specified number of times, then the system may fall back to a fail-safe mode. When the user has failed the specified number of times, the system may fall back to fail-safe at step 314, as noted above. For example, the user may be required to reregister with the cloud system to reverify user authentication factors.

Figure 4:
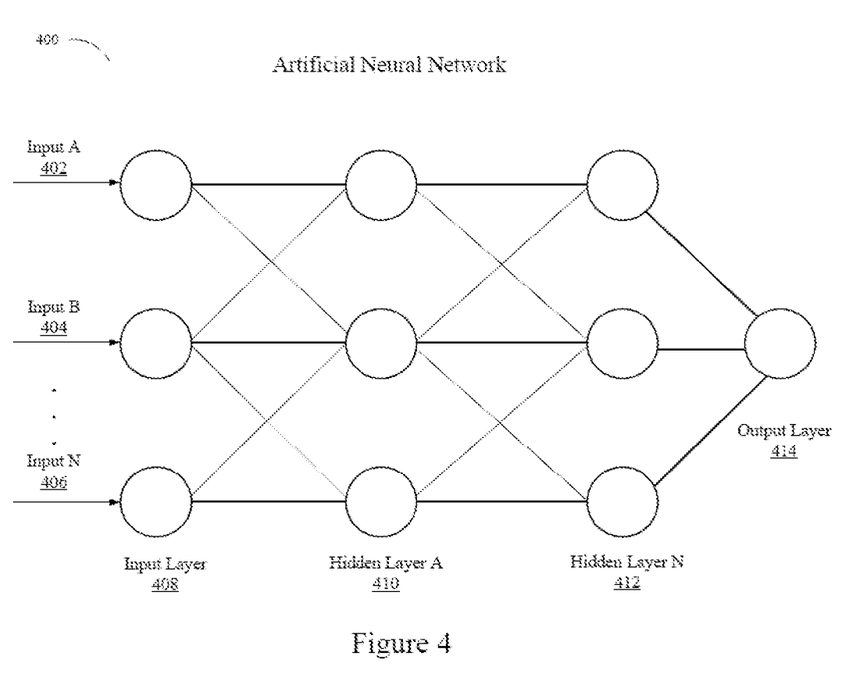
FIG. 4 is an exemplary artificial neural network used in a machine learning algorithm, in accordance with some implementations.

FIG. 4 is an exemplary artificial neural network (ANN) 400 used in a decision model created through machine learning, as an example of a contextual access control algorithm, in accordance with some implementations. ANN 400 may be one or more artificial neural networks as illustrated. ANN includes inputs A-N 402-406, input layer 408, hidden layers A-N 410-412 and output layer 414. In one example, input A 402 may take as input the time of day for digital key accesses or other contextual data. Input B 404 may take a periodic accelerometer reading during digital key accesses or other contextual data. Similarly input N 406 may take as input location data of user device 102 when requesting digital key access.

In some examples, the ANN 400 may be used during learning on the group data in step 206 and/or step 208. In other embodiments, ANN 400 may be used during a digital key access request validation in step 304, for example. In additional embodiments, ANN 400 may be used during individual user learning in steps 206-208. The ANN 400 may also be used in conjunction with the threshold established in step 214. Each of the inputs may be weighed according to the relevant activation function, number of hidden layers, various interconnection combinations, etc.

ANN 400 may be one of many different ANN's used, each for different groupings of data. Examples of data to be used as inputs, includes the number of accesses to a vehicle or other equipment, location, time of day of accesses, day of week of accesses, direction of approach to equipment during accesses, barometer readings at, before and after access requests, accelerometer readings, microphone readings including the noise level, and demographics of the user. ANN 400 may be stored on user device 102 and/or service 106. In another embodiment, ANN 400 may be stored partially on user device 102 or service 106 in conjunction with cloud server network 104. Any of the contextual data noted above can be used as inputs to ANN 400.

Figure 5:
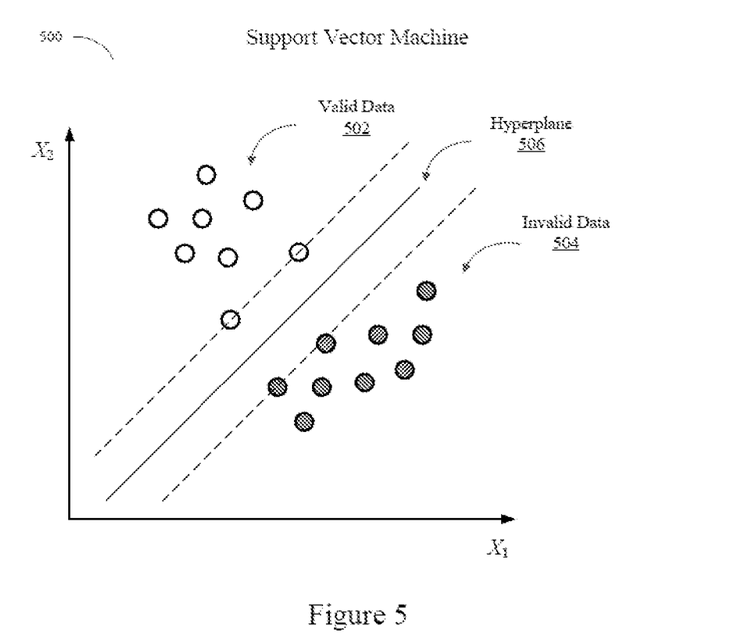
FIG. 5 is an exemplary support vector machine (SVM) used in a machine learning algorithm, in accordance with some implementations

FIG. 5 is an exemplary support vector machine (SVM) 500 used in a machine learning behavioral model, in accordance with disclosed implementations. SVM 500 may be one or more SVM's which are used to map user data, cluster and analyze so that attacker data can be distinguished from valid user data. As illustrated, SVM 500 is a two-dimensional plot of data including hyperplane 506 separating valid data 502, from invalid data 504. Valid data 502 may be plotted during a learning phase. For example, valid data 502 may include user location relative to a service access location during accurate entry attempts. In another embodiment, valid data 502 may indicate the time of day which access requests are being made in a fixed or verified environment.

SVM 500 is merely illustrative and may be a higher dimension SVM which includes, for example, number of accesses to the service, GPS location, time of day of accesses, day of week of accesses, direction of approach to equipment during access attempts, barometer readings at time of access requests, accelerometer readings, and/or nearby Wi-Fi access points. The invalid data 504 may be tracked according to group profiles, as well as attempted failed accesses. For example, when an attacker attempts to gain access to a service, the data at the time of access may be recorded as invalid data 504.

FIG. 6 illustrates an exemplary graphical user interface (GUI) 600 in accordance with some implementations. GUI 600 may include a tolerance configuration as illustrated. GUI 600 is merely illustrative and may present other options for tolerance configuration such as a drop-down list, a machine learning algorithm specific tolerance setting, or a specific value setting. As illustrated a user may be allowed to turn off digital key security in certain instances. For example, a supervisor may have permission to bypass certain aspects of the system in an emergency.

The tolerance level may be configurable, such that a configurator can specify a level for risk situations and localities. For example, when the user is in a highly populated city, the configurator may set the tolerance level high, whereas when the user is in a low populated area like the country, the configurator may choose to set the tolerance level to a lower level.

Figure 7:
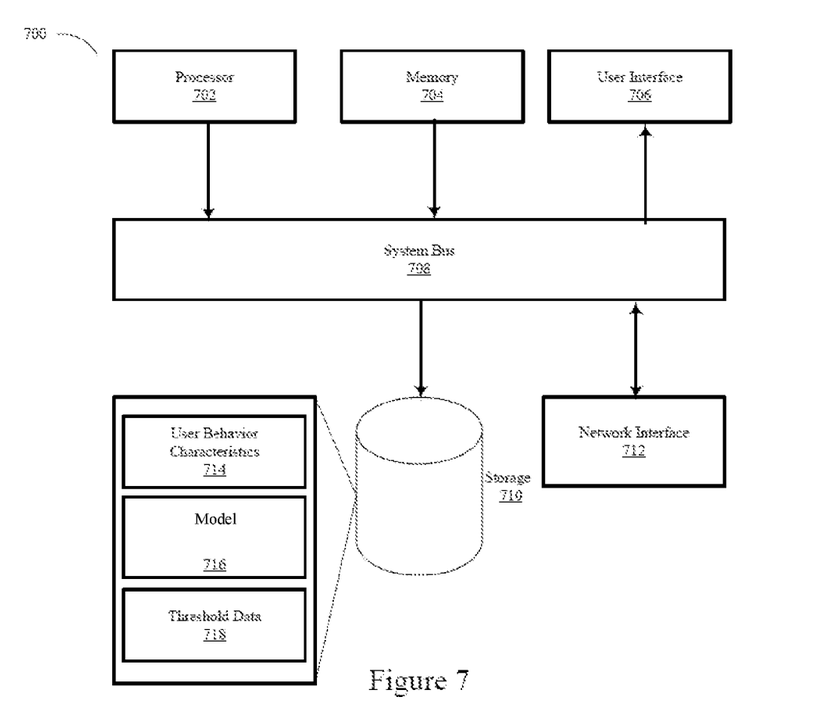
FIG. 7 is a block diagram of an electronic device in accordance with some implementations.

FIG. 7 is a block diagram of computer architecture 700 in accordance with some implementations. The architecture 700 may correspond to one or more of user device 102, server(s) on cloud server network 104, and/or service 106. As shown, electronic device 700 includes processor 702, memory 704, user interface 706, storage 710 and network interface 712 interconnected via one or more system buses 708.

The processor 702 may be any hardware device capable of executing instructions stored in memory 704 or storage 710 or otherwise processing data. As such, the processor may include a microprocessor, one or more field programmable gate array(s) (FPGA), application-specific integrated circuit (ASIC), Graphics Processing Units (GPU) or other similar devices. The memory 704 may include any of various memory types such as L1, L2, L3 cache or system memory. As such, memory 704 may include static random access memory (SRAM), dynamic RAM (DRAM), flash memory, solid state device (SSD), read only memory (ROM), or other similar devices. The user interface 706 may include one or more devices for enabling communication with a user such as an administrator or an owner of a vehicle. For example, the user interface 706 may include a display, a mouse, a keyboard, a touchscreen, or keypad for receiving user commands. The user interface 706 may include a graphical user interface such as that in FIG. 6.

The network interface 712 may include one or more devices for enabling communication with other hardware devices. For example, the network interface 712 may include a network interface card (NIC) configured to communicate according to the Ethernet protocol. Additionally, the network interface 712 may implement a TCP/IP stack for communication according to the TCP/IP protocols. A 4G/5G/LTE, Wi-Fi, or any other wireless protocol may similarly be used. Various alternative or additional hardware or configurations for the network interface 712 will be apparent to one of skill in the art including Bluetooth, and NFC.

The storage 710 may include one or more machine readable storage media such as read only memory (ROM), random access memory (RAM), Solid State Drive (SSD), magnetic disk storage media, optical storage media, flash memory devices, etc. In various embodiments, the storage 710 may store instructions for execution by the processor 702 or data upon which the processor 702 may operate. For example, the storage 710 may store user behavior characteristics such as the number of accesses to the service, GPS or other location data, time, day, months of year of accesses, direction of approach to service, barometer readings, accelerometer readings, microphone readings (e.g. noise level, voice recognition, frequency range and the like), demographics, etc. The storage 710 may also store machine learning algorithm data and instructions 716 for creating and executing one or more decision models, as discussed above. Note that, while instructions 716 are shown in FIG. 7 as being associated with a single system, instructions 716 can be stored on, and executed by, various systems. For example, model creation may be accomplished on a model creation system that is separate from the system that controls access using the model. Additionally, the storage 710 may store threshold data 718 related to the output of the machine learning algorithm for both individuals as well as groups of users and user behavior characteristics 714. As noted above, architecture 700 can correspond to plural devices and the components can be distributed in a networked environment as needed for a particular application. For example, the learning process of a decision model is likely to be accomplished in a computing environment that is separate from the environment in which the model is executed.

It will be apparent to one skilled in the art that various information described as stored in the storage 710 may be additionally or alternatively stored in the memory 704. All memory and storage may include non-transitory machine-readable instructions. Both storage 710 and memory 704 may be considered non-transitory machine-readable media. All functions of the embodiments can be accomplished by software executed on computer processors. The processor(s) may be configured to provide information processing capabilities in various computing devices. The processor(s) may include one or more of a digital processor, an analog processor, a digital circuit designed to process information, an analog circuit designed to process information, a state machine, and/or other mechanisms for electronically processing information.

In some implementations, processor(s) 702 may include a plurality of processing units. These processing units may be physically located within the same device, or processor(s) may represent processing functionality of a plurality of devices operating in coordination. Processor(s) may be configured to execute modules by software; hardware; firmware; some combination of software, hardware, and/or firmware; and/or other mechanisms for configuring processing capabilities on processor(s). As used herein, the term "module" may refer to any component or set of components that perform the functionality attributed to the module. This may include one or more physical processors during execution of processor readable instructions, the processor readable instructions, circuitry, hardware, storage media, or any other components.

As noted above, the disclosed implementations can be applied to any type of "service" as defined herein. As an example, the service could be use of a machine tool by an employee and the threshold can be determined based at least in part on whether the user making the request for use is scheduled to be on duty. In another example, the scope of permissions can be restricted based on user safety records, weather or the like. As an example of such a restriction, a driver of a vehicle could be limited in the permitted speed of the vehicle if the driver's safety record is not adequate and/or if inclement weather is expected or encountered. Further, use of equipment attachment could also be controlled by, for example limiting inexperienced drivers to operate a forklift only at lower heights or slower lift speeds. Access to vehicles or other machinery can also be controlled based on payments or capability subscriptions or contractual terms for specific features or capabilities.

The disclosed implementations ensure that only registered, certified, operators can start and operate equipment. By limiting access to equipment based on contextual information, misuse of equipment by untrained or unauthorized operators can be all but eliminated. Enforcing limitations on drivers of mobile equipment, such as lift speed and drive speed (based on experience, certification, driving history, and safety record) ensures that drivers are given access to the full capabilities of the equipment for which they have demonstrated and certified training.

Daily checks and photos for each driver for a given piece of equipment, as part of the authentication process, can be required to ensure that issues are detected as quickly as possible and more likely to be attributable to a specific operator, activity, or event. These documented checks can also enable additional visibility into the state of the equipment to the rental dealers and equipment owners who are generally not on site with the equipment.

Implementations which provide the ability to control the usage of equipment based on its maintenance posture (e.g. almost due, due, overdue) by the equipment owner and rental dealership can significantly improve the risk of preventable failures and downtime. Maintenance and safety check alerts, logging, and lockout based on impacts, incidents, and overdue maintenance can also improve operator and site safety as well as reduce downtime of the equipment to the site, rental dealer, and equipment owner. The ability for a site manager to ensure that specific equipment, based on capabilities, maintenance, efficiency, and other criteria can be assigned both to the correct task as well as the desired operator ensures that the workplan of the site manager is executed on. This can improve operational efficiency by mandating the correct equipment is always assigned, increase utilization by ensuring the necessary equipment will be available when it is needed, and improve the safety record of a site by guaranteeing that the correct equipment is always used for the proper task. granular control of access to equipment guarantees the fidelity of reporting and billing of fine-grained usage, enabling both shared usage scenarios as well as power by the hour rental models. Additionally, by ensuring that all usage is only by assigned, known operators, untracked or unassigned usage is all but eliminated.

Although telematics is becoming much more widely deployed, it remains challenging to assign telematics data to individual operators. Pin pads are typically configured once and never again, meaning all usage is assigned to one effectively anonymous account, and RFID badge solutions, as single-action connections, can easily be circumvented and remain very limited with respect to dynamic updates, revocation, and granular access management Aligning operator usage data to available telemetric data can significantly improve accountability through the entire value chain from the operator to the equipment owner and can enable many different ways of improving driver behavior, skills, and incidence detection and response. Attributing incidents, such as impacts or collisions, as well as bad behaviors, like leaving a vehicle running, improperly parking without lowering equipment such as forks on a fork-lift, or other such activities can be eliminated and/or addressed.

As fleet ownership models shift from the end customer owned to the dealer or OEM owned, the equipment owner is becoming more and more removed from the equipment with fewer and fewer interactions between the owner and the equipment. Implementations allow fleet owners control over equipment they own but which are physically on customer premises, allowing operator restrictions, prognostics and diagnostics, and even revocation for non-payment in the event of a breakdown of the commercial relationship.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method for controlling access permissions to a piece of machinery, the method comprising:
   receiving behavioral data relating to at least one user;
   receiving, from a user, an access request;
   receiving current user behavioral data from the user and current state data relating to the piece of machinery at a time corresponding to the access request;
   generating a likelihood value, indicating the likelihood the access request is a valid request based on the current user behavioral data and the current state data;
   authenticating the user for access to operate the piece of machinery when the current user likelihood value is determined to be at or above a predetermined threshold value; and
   generating a permissions data structure specifying features of the piece of machinery which can be operated by the user, whereby the permissions data structure can be used to control use of the piece of machinery by the user.

2. The method of claim 1, further comprising requesting a secondary authentication method of the user when the likelihood value is determined to be not at or above the predetermined threshold value.

3. The method of claim 1, wherein the scope of permissions is a default scope of permissions when the likelihood value is determined to be not at or above a predetermined threshold value.

4. The method of claim 1, further comprising:
   receiving repeated behavior and state data over time, including when accessing the service;
   updating the method for generating a likelihood value using the data.

5. The method of claim 1, wherein the behavioral data is for a group of users that are similar demographically to the user.

6. The method of claim 1, wherein one or more of the following machine learning algorithms is used; decision tree, regression, neural network, time series, clustering, outlier detection, ensemble model, factor analysis, naïve Bayes formulation, support vector machine, linear regression, logistic regression, k-nearest neighbors (kNN), k-Means, random forest, dimensionality reduction, gradient boosting, apriori, nearest neighbor, attention layers, generative adversarial networks, and teacher-student curriculum learning.

7. The method of claim 1, wherein the user data includes, for each access to the service, one or more of: user location data, a date and/or time, a weekday, a direction of approach to a service access location, a barometer reading, an accelerometer reading, a microphone reading, wireless frequencies and communications of user device, recent physical activity levels, recent user actions on the user device, results of user gait analysis, recent user location, orientation of the user device, a lock state of the user device, a lock time of the user device and/or a lock duration of the user device.

8. The method of claim 2, wherein the secondary authentication method includes, a least one of requesting a fingerprint, requesting a password or pin, facial identification, user speech identification, requesting user location information, requesting a hardware token, requesting a response by short message service (SMS), near field communications (NFC) communication with a user device, requesting badge information, requesting single sign on (SSO) history information, retina identification, requesting electrocardiogram (EKG) information of the user, user weight, user height and/or a secret knowledge challenge.

9. The method of claim 8, wherein a combination of multiple secondary authentication methods is used to authenticate identity.

10. The method of claim 1, wherein the state data includes state data of the piece of machinery relating to at least one of, usage history of the piece of machinery, work schedule of the piece of machinery, damage to the piece of machinery, safe operations rules for the piece of machinery, maintenance state and schedule of the piece of machinery, odometer data of the piece of machinery and/or current or recent location of the piece of machinery.

11. The method of claim 1, wherein the state data includes external context data including data relating to at least one of, a single sign on (SSO) history for the piece of machinery, Electronic Logging Device (ELD) data for the piece of machinery, operator work schedule, operator login history, data indicating a relationship of the operator to other operators, operator checklist data, work order data, vacation schedule data, sick leave data, holiday schedule data, operator certification/licensing and/or data indicating legal limits on usage of the piece of machinery.

12. The method of claim 11 wherein the state data includes operator certification/licensing data that is retrieved in real time from a registration database.

13. The method of claim 3, wherein the default scope of permissions is based on at least one of site policy, system configuration and/or operator preference.

14. The method of claim 1, wherein elements of the behavioral data for at least one user and the state data relating to the service is selected based on at least one of site policy, system configuration and/or operator preference.

15. The method of claim 2, wherein the secondary mode of authentication is selected based on at least one of site policy, system configuration and/or operator preference.

16. The method of claim 1, wherein elements of the current behavioral data and the current state data relating to the service is selected based on at least one of site policy, system configuration and/or operator preference.

17. The method of claim 1, wherein the piece of machinery is a vehicle or a machine tool.

18. The method of claim 17, wherein the permissions data structure specifies that only an auxiliary system of the machinery can be operated by the operator.

19. A computer system for controlling access permissions to a piece of machinery, the system comprising:
  at least one computer processor; and
  at least one memory operatively coupled to the at least one computer processor and storing computer readable instructions which, when executed by the at least one processor, cause the at least one processor to;
    receive behavioral data relating to at least one user
    receive, from a user, an access request;
    receive current user behavioral data from the user device and current state data relating to the piece of machinery at a time corresponding to the access request;
    generate a likelihood value, indicating the likelihood the access request is a valid request based on the current user characteristic data and the current state data;
    authenticate the user for access operate the piece of machinery when the current user likelihood value is determined to be at or above a predetermined threshold value; and
    generate a permissions data structure specifying features of the piece of machinery which can be operated by the user, whereby the permissions data structure can be used to control use of the piece of machinery by the user.

20. The system of claim 19, wherein the instructions further cause the processor to request a secondary authentication method of the user when the likelihood value is determined to be not at or above a predetermined threshold value.

21. The system of claim 19, wherein the scope of permissions is a default scope of permissions when the likelihood value is determined to be not at or above a predetermined threshold value.

22. The system of claim 19, wherein the behavior and state data is received multiple times over time, including when accessing the service and the method for generating a likelihood value using the data is updated at least once as a result.

23. The system of claim 22, wherein the behavioral data is for a group of users that are similar demographically to the user.

24. The system of claim 19, wherein one or more of the following machine learning algorithms is used; decision tree, regression, neural network, time series, clustering, outlier detection, ensemble model, factor analysis, naïve Bayes formulation, support vector machine, linear regression, logistic regression, k-nearest neighbors (kNN), k-Means, random forest, dimensionality reduction, gradient boosting, apriori, nearest neighbor, attention layers, generative adversarial networks, and teacher-student curriculum learning.

25. The system of claim 19, wherein the user data includes, for each access to the service, one or more of: user location data, a date and/or time, a weekday, a direction of approach to a service access location, a barometer reading, an accelerometer reading, a microphone reading, wireless frequencies and communications of user device, recent physical activity levels, recent user actions on the user device, results of user gait analysis, recent user location, orientation of the user device, a lock state of the user device, a lock time of the user device and/or a lock duration of the user device.

26. The system of claim 20, wherein the secondary authentication method includes, a least one of requesting a fingerprint, requesting a password or pin, facial identification, user speech identification, requesting user location information, requesting a hardware token, requesting a response by short message service (SMS), near filed communications (NFC) communication with a user device, requesting badge information, requesting SSO history information, retina identification, requesting electrocardiogram (EKG) information of the user, user weight, user height and/or a secret knowledge challenge.

27. The system of claim 26, wherein a combination of multiple secondary authentication methods is used to authenticate identity.

28. The system of claim 19, wherein the state data includes state data of the piece of machinery relating to at least one of, usage history of the piece of machinery, work schedule of the piece of machinery, damage to the piece of machinery, safe operations rules for the piece of machinery, maintenance state and schedule of the piece of machinery, odometer data of the piece of machinery and/or current or recent location of the piece of machinery.

29. The system of claim 19, wherein the state data includes external context data including data relating to at least one of, a single sign on (SSO) history for the machine, Electronic Logging Device (ELD) data for the machine, operator work schedule, operator login history, data indicating a relationship of the operator to other operators, operator checklist data, work order data, vacation schedule data, sick leave data, holiday schedule data, operator certification/licensing and/or data indicating legal limits on usage of the machine.

30. The system of claim 29 wherein the state data includes operator certification/licensing data that is retrieved in real time from a registration database.

31. The system of claim 21 wherein the default scope of permissions is based on at least one of site policy, system configuration and/or operator preference.

32. The system of claim 19, wherein elements of the at least one of current behavioral data and/or current state data relating to the service is selected based on at least one of site policy, system configuration and/or operator preference.

33. The system of claim 20, wherein the secondary mode of authentication is selected based on at least one of site policy, system configuration and/or operator preference.

34. The system of claim 19, wherein elements of the current behavioral data and the current state data relating to the service is selected based on at least one of site policy, system configuration and/or operator preference.

35. The system of claim 19, wherein the piece of machinery is a vehicle or a machine tool.

36. The system of claim 35, wherein the permissions data structure specifies that only an auxiliary system of the machinery can be operated by the operator.

* * * * *